Dec. 31, 1935.  E. R. ERICKSON  2,026,085
THERMOMETER MOUNTING
Filed Nov. 19, 1934
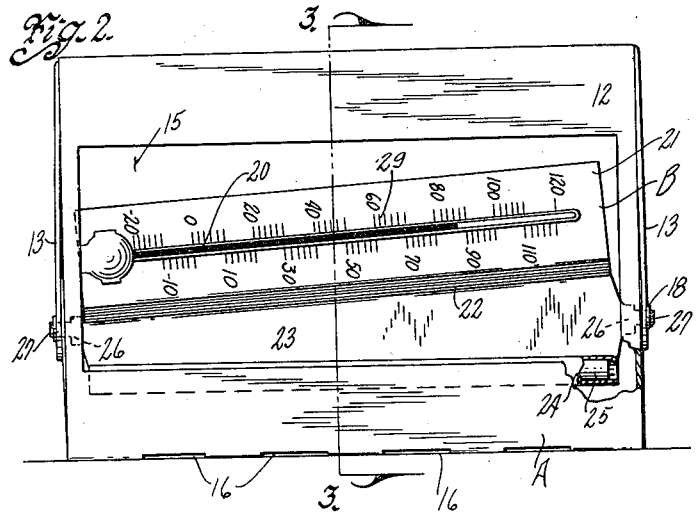
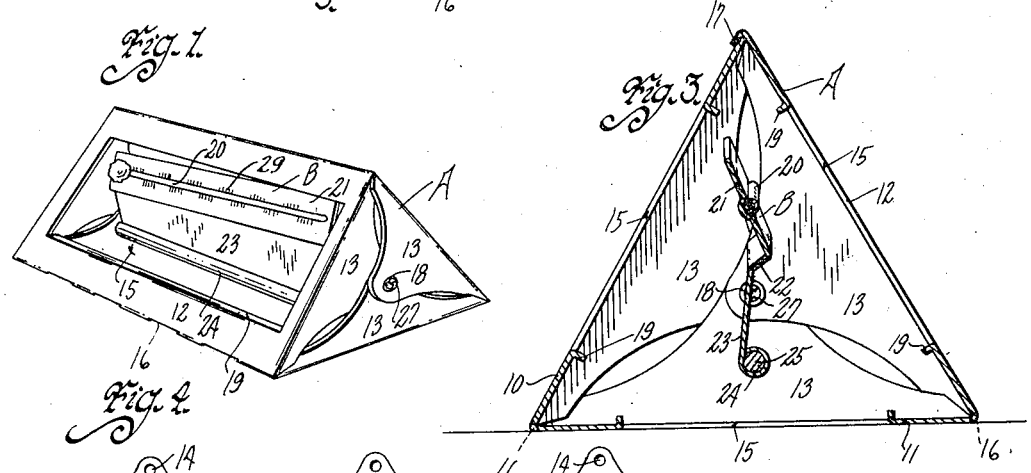
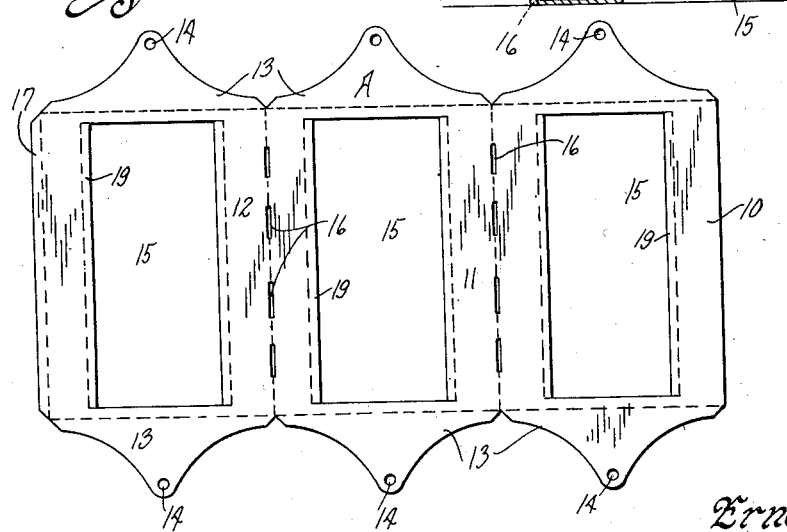
Inventor
Ernest R. Erickson
by Bair, Freeman & Sinclair
Attorneys
Witness
Edw. Leely Patented Dec. 31, 1935

2,026,085

UNITED STATES PATENT OFFICE 2,026,085

THERMOMETER MOUNTING

Ernest R. Erickson, Des Moines, Iowa, assignor to C. E. Erickson Company, Inc., Des Moines, Iowa Application November 19, 1934, Serial No. 753,632

5 Claims. (Cl. 73—52)

The object of my present invention is to provide a novel and simple thermometer mounting of economical construction, peculiarly adapted for use in brooder houses and the like.

It is one of the specific purposes of my invention to provide a thermometer and thermometer mounting intended and adapted for use where small chicks are being raised, the mounting having numerous features of convenience, which will be hereinafter described.

With these and other objects in view, my invention consists in the construction, arrangement and combination of the various parts of my thermometer mounting, whereby the objects contemplated are attained, as hereinafter more fully set forth, pointed out in my claims, and illustrated in the accompanying drawing, in which:

Figure 1 is a perspective view of a thermometer and thermometer mounting embodying my invention.

Figure 2 is a front elevation of the same.

Figure 3 is a vertical, sectional view taken on the line 3—3 of Figure 2; and

Figure 4 is a plan view of the blank from which the thermometer mounting frame may be shaped up.

It is desirable in brooder houses and places where small chicks are being raised to maintain a certain temperature within the enclosure, as for instance two inches above the floor. It is, of course, desirable to have the thermometer so located as to make for the convenient checking of the temperature in the brooder house.

I have therefore provided a thermometer so mounted that it can be conveniently placed in a brooder house or the like for permitting convenient observation and checking the temperature two inches above the floor.

I provide a thermometer with a peculiar back hereinafter to be described supported in a novel frame, which affords protection for the thermometer and convenient means by which the thermometer can be supported at the proper distance above the floor. The frame is one which is triangular in vertical cross section as perhaps best illustrated in Figure 1, and the thermometer with its back member is so constructed and mounted in the frame that the thermometer hangs with its bulb two inches above the support on which the frame rests, and the thermometer will always be in the position shown in Figure 2 regardless of whether the frame be rested upon one side or another.

I shall first describe the frame indicated generally by the reference character A. This frame is preferably made from a sheet of metal by the stamping process. In Figure 4, is illustrated the blank from which the frame may be constructed. The frame consists of three connected, substantially rectangular sections 10, 11 and 12, each having the end wings 13 substantially triangular in outline, each provided at its outer point or apex with a hole 14.

Each rectangular frame portion 10 has a large rectangular central opening 15, so as to permit the thermometer hung in the frame to be easily seen.

At the lines of juncture between the successive portions 10, 11 and 12, the lines are weakened as by the formation of slots 16, which are preferable made during the stamping process.

The blank shown in Figure 4 is then bent to form the frame A illustrated in the other figures, with the edge of the portion 12 at the free side thereof bent over the edge of the portion 10 at the free side thereof, forming the flange 17, as illustrated in Figure 3.

The ends 13 are folded over each other as best illustrated in Figures 1 and 3 until the holes 14 in each end of the frame register with each other, and I then insert through them an ordinary eyelet 18 at each end of the frame. The metal is inturned along the long sides of the openings 15 to form flanges 19, which serve for reinforcing.

I shall now describe the thermometer back and the manner in which it is mounted in the frame A. The thermometer and its back I have indicated generally by the reference character B.

The thermometer is of the ordinary type and is shown at 20. The thermometer 20 is suitably mounted on a thermometer back or holder 21, which has generally the form of a rectangular sheet of metal arranged with its long axis between the ends of the frame A and inclined from the horizontal, with the bulb lower than the other end.

At the lower edge of the thermometer back or support member 21, it has an inclined flange 22. Below the flange 22 is a plate-like portion 23 terminating at its lower edge in a cylindrical roll 24, which receives a heavy wire or the like 25, serving as a weight. The lower edge of the portion 23 is horizontal, while the upper edge is inclined as best shown in Figure 2.

At the ends of the portion 23 and horizontally opposite each other are projecting relative narrow portions 26, which terminate in curled portions 27, curled to form sections of hollow cylinders for providing pintles or axles that may be received in the eyelets 18 by first slightly springing the ends of the frame, then adjusting the pintles 27 to position in line with the eyelets 18 and allowing the ends of the frame to spring back for journaling the members 27 in the eyelets.

The parts are so shaped and arranged that the portion 23 will hang in nearly vertical position and will be so held by the weight 25, and at the same time the thermometer back of the support 21 will be inclined slightly upwardly from the bulb end to its other end, as indicated in Figure 2, and will also be inclined from its bottom upwardly and away from a person standing in front of the thermometer as indicated for instance in Figure 3.

Thus the arrangement is such that the frame A may be set on any one of its sides in a brooder or the like, and the weight 25 will then tend to hang down and hold the parts in their positions shown in Figures 1 and 3 with the face of the thermometer and the graduations 29 on the back 21 conveniently observable through one of the openings 15.

For packing and storage, the thermometer and its back may be kept disassembled from the frame A, but it will be seen from the foregoing explanation that it is an easy matter to install the thermometer in the frame.

The thermometer is then held in convenient position for observation with the bulb the proper distance above the floor.

The construction of the frame is such that the chicks in the brooder are not likely to upset the thermometer to its injury.

Even if the frame A is tipped over, which is not likely, the thermometer will be unhurt and will immediately assume a position convenient for inspection.

I have illustrated a preferred form in which my present invention may be embodied.

I realize that changes may be made in the construction and arrangement of the parts and the materials used in such form without departing from the spirit and purpose of my invention, and it is my intention to cover by my claims any modification of the particular form illustrated, which may be reasonably included within the scope of such claims and which distinguishes from the prior art.

I claim as my invention:

1. In a thermometer structure, an elongated frame substantially triangular in cross section, each side being provided with a sight opening and having its ends inturned, a thermometer including a back therefor arranged within the frame in position inclined upwardly from end to end and also inclined upwardly from bottom to top, an inclined flange at the lower edge of the back of the thermometer, and a portion hanging down from said flange, weighted at its lower part and journaled at its ends in the ends of said frame.

2. In a thermometer structure, a frame substantially triangular in transverse, vertical, cross section, having three sides so that it may rest on either side, each side having a sight opening and having ends, a thermometer, and a graduated back therefor, means for supporting the thermometer and back, pivotally between the ends of the frame, with the thermometer inclined from its bulb end upwardly, and the back also inclined from its lower edge upwardly, whereby the thermometer may be read through a sight opening regardless of which side the frame rests on.

3. In a thermometer structure, a casing having a plurality of sides, provided with sight openings and having ends, a thermometer, and a graduated back therefor, means for supporting the thermometer and back, pivotally between the ends of the frame, with the thermometer inclined from its bulb end upwardly, and the back also inclined from its lower edge upwardly, said means comprising portions journaled in the ends, and downhanging weight means, whereby the thermometer can be read through a sight opening when the casing rests on any of its sides.

4. In a structure of the kind described, an elongated frame comprising three sides successively connected, each side being provided with a suitable sight opening, said frame having end members, eyelets connecting the end members at each end of the frame and forming aligned bearings, a thermometer, and a support therefor having members journaled in the eyelets, said support also having an upper portion supporting the thermometer, and lying normally in a position inclined from end to end and from front to rear, and a lower weighted portion.

5. In a device of the kind described, a casing having a plurality of sides provided respectively with sight openings, and having a thermometer in the casing, means for journaling the thermometer on the ends of the casing, and means for maintaining the thermometer in a predetermined position, whereby the casing may be placed on any one of a plurality of sides, and the face of the thermometer will be visible through one of the sight openings.

ERNEST R. ERICKSON.